United States Patent [19]
Golden et al.

[11] Patent Number: 5,258,571
[45] Date of Patent: Nov. 2, 1993

[54] SEPARATIONS USING HIGHLY DISPERSED CUPROUS COMPOSITIONS

[75] Inventors: Timothy C. Golden, Allentown; Wilbur C. Kratz, Macungie; Frederick C. Wilhelm, Zionsville; Ronald Pierantozzi, Orefield; Andrzej Rokicki, Alburtis, all of Pa.

[73] Assignee: Air Products and Chemicals, Inc., Allentown, Pa.

[21] Appl. No.: 945,282

[22] Filed: Sep. 14, 1992

Related U.S. Application Data

[60] Division of Ser. No. 744,181, Aug. 8, 1991, Pat. No. 5,175,137, which is a continuation-in-part of Ser. No. 572,067, Aug. 23, 1990, Pat. No. 5,126,310.

[51] Int. Cl.$^5$ .................. C07C 7/12; B01J 20/02; B01J 8/00; B01D 19/00
[52] U.S. Cl. .................... 585/829; 585/820; 423/247; 423/246; 502/417; 502/181; 502/400; 502/407; 502/415; 95/140; 95/144; 95/900
[58] Field of Search ............ 585/829, 820; 423/247, 423/246; 55/68, 74; 502/417, 181, 400, 407, 415

[56] References Cited

U.S. PATENT DOCUMENTS

| | | | |
|---|---|---|---|
| 1,914,558 | 6/1933 | Craver . | |
| 3,455,843 | 7/1969 | Briggs et al. | 252/455 |
| 3,789,106 | 1/1974 | Hay | 423/247 |
| 4,019,879 | 4/1977 | Rabo et al. | 55/68 |
| 4,470,829 | 9/1984 | Hirai et al. | 55/68 |
| 4,587,114 | 5/1986 | Hirai et al. | 423/247 |
| 4,713,090 | 12/1957 | Yokoe et al. | 55/68 |
| 4,743,276 | 5/1988 | Nishido et al. | 55/68 |
| 4,914,076 | 4/1990 | Tsuji et al. | 502/407 |
| 4,917,711 | 4/1990 | Xie et al. | 55/68 |

*Primary Examiner*—Anthony McFarlane
*Assistant Examiner*—Nhat D. Phan
*Attorney, Agent, or Firm*—Geoffrey L. Chase; James C. Simmons; William F. Marsh

[57] ABSTRACT

The present invention is directed to a process for adsorptive separation of carbon monoxide or olefins from gas mixtures using adsorbents, which comprise cuprous compounds dispersed on amorphous oxide or carbon macroporous supports. The compositions are prepared by impregnating cupric compounds on, preferably pretreated, supports with the aid of an aqueous solution of an ammonium salt of a di- or polycarboxylic acid dispersant, such as ammonium citrate, followed by reduction of the cupric compound to the corresponding cuprous compound. The reduction can be performed either by the use of elevated temperature or by the use of a reducing gas preferably carbon monoxide at relatively low temperatures up to 150° C. Methods of synthesis are also disclosed.

11 Claims, No Drawings

SEPARATIONS USING HIGHLY DISPERSED CUPROUS COMPOSITIONS

This is a division of application Ser. No. 07/744,181, filed Aug. 8, 1991, now U.S. Pat. No. 5,175,137, which is a continuation-in-part of application Ser. No. 07/572,067, filed Aug. 23, 1990, now U.S. Pat. No. 5,126,310.

FIELD OF THE INVENTION

The present invention is directed to adsorptive separation of carbon monoxide or olefins from gas mixtures using adsorbents of active composite copper-containing compositions produced by impregnation of a support with cupric compounds using nitrogen-containing dispersants. More specifically, the present invention is directed to such separations using copper-containing compositions as adsorbents, selective for carbon monoxide or olefins, containing highly dispersed cupric/cuprous compounds, which are dispersed on a, preferably pretreated, support, impregnated with cupric compound precursors using nitrogen-containing dispersants and subsequently reduced to a cuprous compound. The reduction is performed either by elevated temperature or reducing gas, preferably containing carbon monoxide.

BRIEF DESCRIPTION OF THE PRIOR ART

Both carbon monoxide and hydrogen are gases widely used in the chemical industry. The current technique used to produce both pure hydrogen and carbon monoxide is to steam reform methane, remove carbon dioxide by scrubbing with amine solutions and finally cryogenic separation of carbon monoxide and hydrogen. However, there is considerable interest in developing an adsorption process that is capable of separating carbon monoxide and hydrogen. The key advantages of an adsorption system over cryogenic separations are low energy requirements, capability of producing higher purity hydrogen and absence of any needs for liquid cryogens. The principle technical hurdle in developing an adsorption system to produce high purity carbon monoxide is achieving an adsorbent that is capable of separating dilute, unreacted methane in the steam methane reformation off-gas from bulk carbon monoxide. The carbon monoxide over methane selectivity of an adsorbent must be high to produce a high purity carbon monoxide stream. Chemical users of carbon monoxide are requiring higher and higher product purity to eliminate unwanted side reaction during carbon monoxide use and the synthesis of engineering plastics and polyurethane foams. Current methane purity specification in carbon monoxide for many applications is nearing 25 PPM or less. Thus, an adsorbent capable of producing carbon monoxide of this purity must demonstrate high carbon monoxide selectivity. In addition to high carbon monoxide selectivity, an adsorbent for this process must also exhibit a large carbon monoxide working capacity. The larger the carbon monoxide working capacity, the smaller the adsorption beds and lower capital costs for such an adsorptive separation.

U.S. Pat. No. 3,789,106 discloses the use of zeolites and mordenites that have their sodium ions ion-exchanged with copper as well as other metals to adsorb carbon monoxide. The main objective is to remove trace amounts of carbon monoxide from gas mixtures. In the case of this patent, the copper ion becomes a cation replacing sodium in the zeolitic or mordenitic molecular sieve structure.

U.S. Pat. No. 4,019,879 discloses the adsorptive separation of carbon monoxide using zeolitic molecular sieves which are ion exchanged to introduce cations of cuprous valences into the structure. Cupric ions may first be impregnated in the zeolitic structure followed by reduction of the cupric ions to cuprous ions in the ion exchange procedure.

U.S. Pat. No. 4,470,829 discloses an adsorbent for selective adsorption of carbon monoxide comprising a copper halide, an aluminum halide and a polystyrene or its derivative as one embodiment or a copper halide and aluminum halide and activated carbon or graphite as a second embodiment. The adsorbent is produced by mixing together the three components in a hydrocarbon solvent and then driving off the solvent.

U.S. Pat. No. 4,587,114 discloses the production of a carbon monoxide adsorbent using cuprous or cupric compounds impregnated on a carbon support using solvents which are removed after the impregnation. The solvents include water, aqueous hydrochloric acid or ammonium formate, primary or secondary alcohol having 1 to 7 carbon atoms, acetone, ethylacetate, formic acid, acetic acid, benzene, toluene, propionitrile, acetonitrile and aqueous ammonica.

U.S. Pat. No. 4,713,090 discloses a carbon monoxide adsorbent comprising a composite support of silica and/or alumina and activated carbonized material carrying a copper compound impregnated with the assistance of a solvent including aqueous solutions of ammonical formic acid, ammonia water and nitrogen-containing solvents selected from the group of propionitrile, acetonitrile, diethyl amine, dimethyl formamide and N-methyl pyrrolidone.

U.S. Pat. No. 4,914,076 discloses an adsorbent for selective adsorption of carbon monoxide comprising a support of alumina or silica-alumina impregnated with a cupric salt carried by a solvent incorporating a reducing agent, after which the solvent is removed and the cupric salt is reduced to a cuprous salt. The solvent utilized to deposit the cupric compound was water containing a reducing agent. Other solvents identified include formalin, formic acid, alcohol and the like. The reducing agent includes low valence metal salts of iron, tin, titanium and chromium and organic compounds in low degree of oxidation including aldehydes, saccharides, formic acid, oxallic acid and so on.

U.S. Pat. No. 4,917,711 discloses a carbon monoxide selective adsorbent produced from mixing in solid form or through solvent intermixing a support from the group of zeolites, alumina, silica gel, alumino silicate, alumino phosphate and combinations with a cuprous compound, wherein the cuprous compound can be derived from a cupric compound deposited on the support from a solvent selected from the group of water, hydrochloric acid-containing aqueous solution, primary or secondary alcohols having 1 to 7 carbon atoms, acetone, ethylacetate, hydrocarbons having 4 to 7 carbon atoms, propionitrile and acetonitrile.

U.S. Pat. No. 1,914,558 discloses methods for making various metal catalysts by reacting metal compounds with organic acids to form metallic-organo complexes, placing them on supports and igniting the composite to oxidize or reduce the metal.

U.S. Pat. No. 3,455,843 discloses an exhaust catalyst consisting of cupric oxide and palladium supported on a base. The metals are complexed with ammonia or amine hydroxy acids.

Some of these prior art patent attempt to produce a carbon monoxide selective adsorbent, but fail to provide sufficiently high dispersions of cuprous ions on a macroporous support to effectively adsorb bulk quantities of carbon monoxide from gas mixtures additionally containing methane, wherein the adsorbent has sufficiently high selectivity for carbon monoxide over methane, so as to permit carbon monoxide purities with less than 25 ppm of methane. The present invention overcomes these drawbacks by providing a novel adsorbent, having unexpectedly high dispersions of cuprous ion on the macroporous support as will be described in greater detail below.

BRIEF SUMMARY OF THE INVENTION

The present invention is a process of selectively separating a gas component selected from the group consisting of carbon monoxide or olefins from a gas mixture containing said gas component and at least one other gas selected from the group consisting of carbon dioxide, methane, nitrogen, hydrogen, argon, helium, ethane and propane, comprising contacting the gas mixture with a copper-containing adsorbent comprising a high surface area support of amorphous oxide or carbon and a dispersed cuprous compound prepared by impregnating the support with a cupric compound in an aqueous solvent having an ammonium salt of di- or polycarboxylic acid dispersant, dispersing the compound on the support with the dispersant, removing the solvent and reducing the cupric compound to a cuprous compound on the support, selectively adsorbing the gas component on the adsorbent, and separately desorbing the gas component from the adsorbent to recover the gas component.

Preferably, the cupric compound is reduced in the presence of a reducing gas.

Preferably, the reducing gas contains carbon monoxide.

Alternatively, the reducing gas contains synthesis gas.

Preferably, the cupric compound is reduced in the presence of a reducing gas at a temperature up to approximately 150° C.

Preferably, the cupric compound is reduced in the presence of a reducing gas at a temperature up to approximately 150° C.

Alternatively, the cupric compound is reduced by heating to a temperature of approximately 150° to 400° C.

Preferably, an amorphous oxide support is pretreated by heating to an elevated temperature to make the support more susceptable to impregnation of the compound.

Alternatively, a carbon support is pretreated by oxidation to make the support more susceptable to impregnation of the compound.

Preferably, the ammonium salt of di- and polycarboxylic acid dispersant is selected from the group consisting of ammonium citrate, ammonium tartrate, ammonium succinate, ammonium phthalate, ammonium adipate, ammonium (ethylenediamine)tetraacetate, and mixtures thereof.

Preferably, the cupric compound is selected from the group consisting of cupric halides, cupric carboxylates, cupric oxygen acids, cupric amine complexes and mixtures thereof.

Preferably, the gas mixture is passed through one or more beds of the adsorbent in a sequence of steps, comprising: adsorbing the gas component from the gas mixture in a bed of such adsorbent, desorbing the bed of adsorbent after adsorption, purging the bed of adsorbent with the gas component, evacuating the bed of adsorbent to recover the gas component, and repressurizing the bed of adsorbent to the pressure of adsorption by passing a non-adsorbed gas into the bed of adsorbent.

In a preferred embodiment, the present invention is a process of selectively separating carbon monoxide from a gas mixture containing carbon monoxide and at least one other gas selected from the group consisting of carbon dioxide, methane, nitrogen, hydrogen, argon, helium, ethane and propane, comprising contacting the gas mixture with a copper-containing adsorbent comprising a high surface area support of amorphous oxide or carbon and a dispersed cuprous compound prepared by impregnating the support with a cupric compound in an aqueous solvent having an ammonium salt of di- or polycarboxylic acid dispersant, dispersing the compound on the support with the dispersant, removing the solvent and reducing the cupric compound to a cuprous compound on the support in the presence of a reducing gas containing carbon monoxide at a temperature up to approximately 120° C., selectively adsorbing carbon monoxide on the adsorbent, and separately desorbing the carbon monoxide from the adsorbent to recover the carbon monoxide.

The present invention is also directed to a composite, copper-containing adsorbent, comprising a high surface area support of amorphous oxide or carbon and a dispersed cuprous compound, prepared by impregnating the support with a cupric compound in an aqueous solvent and an ammonium salt of a di- or polycarboxylic acid dispersant, dispersing the compound on the support with the dispersant, removing the solvent and reducing the cupric compound to the cuprous compound.

Preferably, the cupric compound is reduced in the presence of a reducing gas.

Preferably, the reducing gas contains carbon monoxide.

Alternatively, the reducing gas contains synthesis gas.

Preferably, the cupric compound is reduced in the presence of a reducing gas at a temperature up to approximately 150° C.

Preferably, the cupric compound is reduced in the presence of a reducing gas at a temperature up to approximately 120° C.

Alternatively, the cupric compound is reduced by heating to a temperature of approximately 150° to 400° C.

Preferably, the adsorbent is selective for carbon monoxide or olefins.

Preferably, an amorphous oxide support is pretreated by heating to an elevated temperature to make the support more susceptable to impregnation of the compound.

Alternatively, a carbon support is pretreated by oxidation to make the support more susceptable to impregnation of the compounds.

Preferably, the ammonium salt of di- and polycarboxylic acid dispersant is selected from the group consisting of ammonium citrate, ammonium tartrate, ammonium succinate, ammonium phthalate, ammonium adipate, ammonium (ethylenediamine)tetraacetate, and mixtures thereof.

Preferably, the cupric compound is selected from the group consisting of cupric halides, cupric carboxylates, cupric oxygen acids, cupric amine complexes and mixtures thereof.

In a preferred embodiment, the present invention is an adsorbent selective for carbon monoxide comprising a composite, copper-containing composition comprising a high surface area support of amorphous oxide or carbon and a dispersed cuprous compound, prepared by impregnating the support with a cupric compound in an aqueous solvent and an ammonium salt of a di- or polycarboxylic acid dispersant, dispersing the compound on the support with the dispersant, removing the solvent and reducing the cupric compound to a cuprous compound on the support by contact with a reducing gas at a temperature up to approximately 120° C.

In a more preferred embodiment, the present invention is an adsorbent selective for carbon monoxide preferentially over carbon dioxide, methane and nitrogen, comprising an active, composite, copper-containing composition comprising a high surface area support of macroporous alumina, pretreated by heating at an elevated temperature in an inert gas to make the support more susceptable to impregnation of a cupric compound, and a dispersed cuprous ion in which the composition is prepared by impregnating the alumina support with cupric chloride dissolved in water and an ammonium citrate dispersant, dispersing the cupric chloride on the support with the dispersant, removing the water and reducing the cupric chloride to a cuprous ion on the alumina support by contact with a reducing gas at a temperature up to approximately 120° C.

The present invention is further a method for synthesis of a composite, copper-containing adsorbent having a high surface area support of amorphous oxide or carbon and a dispersed cuprous compound, comprising contacting such support with an aqueous solvent containing a cupric compound and an ammonium salt of a di- or polycarboxylic acid dispersant to impregnate4the support with the cupric compound, dispersing the compound on the support with the dispersant, removing the solvent from the support and reducing the cupric compound to a cuprous compound.

Preferably, the cupric compound is reduced in the presence of a reducing gas.

Preferably, the cupric compound is reduced in the presence of a reducing gas at a temperature up to approximately 150° C.

Preferably, the cupric compound is reduced in the presence of a reducing gas at a temperature up to approximately 120° C.

Alternatively, the cupric compound is reduced by heating to a temperature of approximately 150° to 400° C.

Preferably, an amorphous oxide support is pretreated by heating to an elevated temperature prior to impregnation with the cupric compound to render the support more susceptible to the impregnation.

Alternatively, a carbon support is pretreated by oxidation prior to impregnation with the cupric compound to render the support more susceptible to the impregnation.

Preferably, the ammonium salt of di- or polycarboxylic acid dispersant is selected from the group consisting of ammonium citrate, ammonium tartrate, ammonium succinate, ammonium phthalate, ammonium adipate, ammonium (ethylenediamine)tetraacetate, and mixtures thereof.

Preferably, the cupric compound is selected from the group consisting of cupric halides, cupric carboxylates, cupric oxygen acids, cupric amine complexes and mixtures thereof.

DETAILED DESCRIPTION OF THE INVENTION

The present invention is directed to methods of gas separation using composite, copper-containing compositions useful as adsorbents, wherein the compositions contain a highly dispersed cupric and/or cuprous ion typically in the form of a compound, on a macroporous support such as amorphous oxide or carbon. Preferably, the support has been pretreated to enhance the dispersion of cupric and/or cuprous ions.

A critical feature of the present invention is obtaining high dispersions of cupric and/or cuprous ions. High dispersions of the active cupric and/or cuprous ion enhances the capacity of the composition as an adsorbent. It is important to have highly dispersed cupric and/or cuprous ions in order to effect the highest active surface area of the active species of cupric and/or cuprous Ions for a given quantity of the composition. To affect this high level of dispersion, the present invention utilizes ammonium salts of di- and/or polycarboxylic acid dispersants in aqueous solutions which carry a cupric compound to impregnate the relevant support with such cupric compound in a highly dispersed form for subsequent reduction. Using the ammonium salts of di- and/or polycarboxylic acid dispersants to effect high dispersion of the cupric compound, results in the composite composition being in the best physical form for subsequent reduction to an active state for adsorption. Additional effect on obtaining high dispersion is achieved by pretreating the supports prior to administration of the aqueous cupric compound-containing solvent using the ammonium salts of di- and/or polycarboxylic acid dispersants. A combined effect of pretreatment of the support to render the surface of the support amenable to the cupric compounds and the ammonium salts of di- and/or polycarboxylic acid dispersant which assists in the distribution of the cupric compound from the aqueous solvent achieves the highest dispersion. Cupric compounds are best utilized as impregnants/solutes in aqueous solutions, but cuprous compounds have the highest affinity for carbon monoxide. Although not wishing to be limited to any particular theory, the present invention impregnates generally bivalent copper in aqueous solution onto a support and then activates the composite which is believed to reduce at least a portion of the bivalent copper to monovalent copper sufficient in extent to be an effective carbon monoxide bulk adsorbent. Therefore, activation as used in this invention includes the action of reduction from the bivalent state to the monovalent state, but does not preclude other phenomena that cause the composite composition to achieve selectivity for carbon monoxide as a result of treatment at elevated temperatures.

The activation can preferably be conducted as a reduction of the bivalent copper to monovalent copper either by subjecting the composite to elevated temperatures alone or by subjecting the composite to a reducing gas, preferably containing carbon monoxide, such as synthesis gas which is an industry accepted term for the product of hydrocarbon reformation to produce a mixture of hydrogen and carbon monoxide.

The copper loadings that are preferably achieved by the techniques of the present invention are in the range of approximately 3 to 65 weight % copper based on the total composite composition.

The amorphous oxide and carbon supports are both compounds well known in the prior art and do not require further description. Each such support is selected from those forms of amorphous oxide or carbon which have macroporous structure, particularly in contrast to the molecular size of molecules, such as methane. More specifically, the amorphous oxide or carbon support should not effect molecular sieving and capture of molecules, such as methane. The amorphous oxides include alumina, silica-alumina, silica, titania and mixtures thereof. The term amorphous indicates a generally noncrystalline molecular structure. Crystalline materials, such as zeolites are not included. The macroporosity constitutes a support structure that has a predominant amount of its pores larger than approximately 20 Angstroms in diameter. The macroporosity is such as to avoid sieving and surface affinity enhancements for molecules, such as methane.

Illustrative of the cupric compounds are cupric halides such as cupric chloride, fluoride and bromide, salts of oxygen acids or organic acids such as cupric formate, acetate, sulfate, nitrate, fluorsilicate, chlorate, perchlorate, bromate and borate, cupric dichromate and amine complex salts, such as cupric hexamine dichloride, and mixtures thereof.

Illustrative of the ammonium salts of di- and polycarboxylic acid dispersants are ammonium citrate, ammonium tartrate, ammonium succinate, ammonium phthalate, ammonium adipate, ammonium (ethylenediamine)-tetraacetate (EDTA), and mixtures thereof.

Preferably, the synthesis process for producing the composite compositions of the present invention includes pretreatment of the macroporous support which assists in dispersing the copper on the surface of the support and therefore increases carbon monoxide adsorptive capacity of adsorbents utilized in the compositions. Dissolution of the cupric compound in an aqueous solution is also important. Dispersing the solution using an ammonium salt of a di- or polycarboxylic acid dispersant to affect the highest level of dispersion possible is also significant as is continuing the addition of copper until the appropriate desired weight loading of the cupric compound is achieved, and finally reduction of the composite composition by contact with a reducing gas at temperatures up to 120° C., such as carbon monoxide, or alternatively, heating, preferably in an inert gas, in the range of approximately 150° to 400° C., assists in providing the highest activity of the composition. The initial significant step in the synthesis of the composite, compositions of the present invention is the pretreatment of the macroporous support of amorphous oxide or carbon. In the case of carbon supports, the pretreatment step is an oxidation step. This step can be a gas-phase oxidation with oxygen, air, ozone, oxides of carbon and nitrogen or steam or their mixtures. Alternatively, the oxidation can be carried out with a liquid phase oxidant like nitric acid or hydrogen peroxide. This oxidation step is done so that the normally hydrophobic carbon surface is converted to a more hydrophilic one. Then the aqueous solution of cupric compound can be more readily applied to the surface of the support and the dispersion of the copper compound on the support surface is greater. In the case of an amorphous oxide support, heat treatment of the amorphous oxide support, preferably in inert gases, increases the acidity and the water adsorptive capacity of the amorphous oxide support. This acidity leads to greater receptiveness to the copper compound and again increased dispersion of the copper on the amorphous oxide support.

Copper in the reduced state, either copper in the valence of one or copper metal is active for carbon monoxide binding, the copper in a bivalent state is not. However, copper in the bivalent salt state is very soluble in aqueous solution, while copper in the monovalent salt state is sparingly soluble in either strong acid or base. Hence, compositions where adsorbents are produced from bivalent copper, followed by in situ reduction to monovalent copper or metal are easier and less expensive to produce.

The following examples describe techniques to make carbon monoxide adsorbents based on the use of bivalent copper salts and ammonium salts of di- and polycarboxylic acid dispersants and activation or reduction by the action of elevated temperature alone.

EXAMPLE 1

Sixteen pounds of LaRoche activated alumina grade 201 was heat treated in air at 200° C. for 16 hours. The alumina was then impregnated with 3.6 liters of an aqueous solution containing 5.0 pounds of $CuCl_2.2H_2O$ and 0.6 pounds of ammonium citrate. The material was then air dried at 250° F. for 16 hours and then activated at 200° C. in nitrogen for another 16 hours.

EXAMPLE 2

Sixteen pounds of granular Darco activated carbon from American Norit was heat treated in wet (20% relative humidity) air at 250° F. for sixteen hours. Following this treatment, the carbon was impregnated with a 7.3 liter aqueous solution containing 11.2 pounds of $CuCl_2.2H_2O$ and 0.8 pounds of ammonium citrate dibasic and dried in nitrogen at 250° F. for sixteen hours. The adsorbent was then activated in nitrogen at 200° C.

The results of static and dynamic testing of the adsorbents prepared in Examples 1 and 2 are shown in Tables 1 and 2 below.

TABLE 1

| Adsorbent | (mmole/g/atm) $K_H$ CO at 30° C. | (mmole/g/atm) $K_H$ $CH_4$ at 30° C. | $S_H$ | (mmole/g) N CO. 2 atm. 30° C. |
|---|---|---|---|---|
| Linde 5A | 6.6 | 1.1 | 6.0 | 1.3 |
| Cu(II) on alumina (Ex. 1) | 34.5 | 0.035 | 985.7 | 1.0 |
| Cu(II) on Darco (Ex. 2) | 7.5 | 0.048 | 156.3 | 1.2 |
| Cu(II) on alumina (no pretreat) | 17.1 | 0.042 | 407.1 | 0.8 |

TABLE 2

| Adsorbent | $S_T$ | (mmole/g) $Q_e$ | (mmole/g) $Q_{LPP}$ | (mmole/g) $Q_P$ | $Q_{LPP}/Q_e$ |
|---|---|---|---|---|---|
| Linde 5A | 1.8 | 0.87 | 0.57 | 0.30 | 66% |
| Cu(II) on alumina (Ex. 1) | 7.2 | 0.66 | 0.22 | 0.44 | 33% |
| Cu(II) on Darco (Ex. 2) | 5.3 | 0.84 | 0.28 | 0.56 | 33% |

The results in Table 1 were obtained in a standard volumetric adsorption apparatus for measurement of equilibrium adsorption isotherms. The results in Table 2 were obtained in the single column unit, 2 inches in diameter and four feet in length. The sequence of steps followed to obtain the results presented in Table 2 are as follows:

1. Presaturation of the bed with 10% carbon monoxide and 90% hydrogen at 5 psig;
2. Countercurrent repressurization with hydrogen to 200 psig;
3. Cocurrent adsorption of a feed mixture containing 25% carbon monoxide, 2% methane, 1% nitrogen and 72% hydrogen at 200 Psig;
4. Cocurrent depressurization of the column to 5 psig;
5. Cocurrent purge with carbon monoxide at 5 psig.

The results in Table 2 were obtained at 24° C.

The results presented in Table 1 include the Henry's Law Constant for carbon monoxide and methane adsorption, $K_H$ CO and $CH_4$, respectively, the Henry's Law selectivity $S_H$ and the carbon monoxide capacity of the adsorbents at 30° C. and 2 atmospheres pressure. Table 1 shows that the adsorbents produced following Examples 1 and 2 have a much greater $CO/CH_4$ then conventional zeolitic adsorbents. The carbon monoxide and methane adsorption characteristics for 5A zeolite are given in Table 1 for comparison purposes. The Henry's Law selectivity of 5A zeolite for carbon monoxide over methane is about 6, while the value for adsorbents produced by techniques described in the disclosure vary from 150 to 1,000. A high $CO/CH_4$ selectivity is required of adsorbents for this application to produce high purity carbon monoxide. The other primary adsorbent requirement for this application is a large carbon monoxide capacity. Table 1 also gives carbon monoxide capacities of the various adsorbents at 30° C. and 2 atmospheres of carbon monoxide pressure. The results show that the carbon monoxide capacity of the adsorbents produced with techniques described in this disclosure have capacity about equal or greater than those of 5A zeolite. Thus, equilibrium single component adsorption isotherms indicate that the adsorbents produced using techniques described in the present invention, have the necessary adsorbent requirements of high $CO/CH_4$ selectivity and high carbon monoxide capacity.

The results presented in Table 2 demonstrate dynamic adsorbent performance by measurement of breakthrough curves. The data presented in Table 1 are results of single component measurements, while the data in Table 2 is from adsorbent testing with multicomponent gas mixtures. The results depicted in Table 2 include the thermodynamic selectivity of the adsorbent under feed conditions, $S_T$, the evacuated carbon monoxide capacity between 0.1 and 1 atmosphere, $Q_e$, the amount of low pressure carbon monoxide purge needed to clean the bed free of methane, $Q_{LPP}$, the carbon monoxide productivity of the adsorbent, $Q_p$, which is equal to $Q_e-Q_{LPP}$ and the percentage of the evacuation quantity required for low pressure carbon monoxide purge. Clearly, the thermodynamic selectivity of the adsorbents of the present invention are superior to that of 5A zeolite. This improved selectivity corresponds to improved carbon monoxide and methane separation during the feed step. In addition to improved $CO/CH_4$ separation, which is needed to produce high purity carbon monoxide, the adsorbents disclosed herein demonstrate higher carbon monoxide productivity than 5A zeolite. This means smaller bed sizes are required for the new materials. Finally, all the new adsorbents require less low pressure carbon monoxide purge than 5A zeolite. The process employed to produce high purity carbon monoxide, which is more thoroughly described below, requires that the effluent gas from the low pressure purge is recycled to the feed of the bed to keep the carbon monoxide recovery high. The low pressure purge effluent, which is at about atmospheric pressure, must be recompressed to feed pressure (approximately 200 psig). This puts a severe power penalty on the process. Hence, the lower the low pressure purge requirement, the lower the power requirements for the process. Thus, single column testing of the new adsorbents show that compared to conventional adsorbents, the materials of the present invention have (1) improved $CO/CH_4$ selectivity and therefore improved $CO/CH_4$ separation, (2) improved carbon monoxide productivity and therefore reduced bed sizes, and (3) reduced low pressure purge requirements and therefore lower process power requirement.

The utility of the adsorbents produced by the present invention was also tested in a pilot development unit to obtain process design parameters. The unit consists of four beds, 12 feet in length and 2 inches in diameter. Two of the beds were filled with the adsorbent described herein, while two of the other beds contained 5A zeolite for hydrogen purification recovery. Only the cycle for the two beds used for carbon monoxide recovery will be described. The steps include (1) pressurization with pure hydrogen countercurrent to the direction of feed to superambient pressure (200 psig), (2) feed with a gas mixture containing carbon monoxide, methane, hydrogen and nitrogen at 200 psig, (3) cocurrent depressurization of the column to 25 psig. (This depressurization effluent is recycled to the feed end of the bed to insure high carbon monoxide recovery), (4) cocurrent purge with product carbon monoxide at 0 to 5 psig and (5) evacuation of pure carbon monoxide product at vacuum levels of 80 torr. Then the cyclic process is continued from steps 1 through 5. The important process parameters obtained from these experiments include the evacuated carbon monoxide product $Q_e$, the amount of carbon monoxide low pressure purge required, $Q_{LPP}$ and the carbon monoxide productivity of the adsorbent, $Q_p$, which is given by $Q_e-Q_{LPP}$. From a process point of view, it is desirable to increase the values of $Q_p$, while minimizing $Q_{LPP}$ quantities. Clearly, as $Q_p$ increases, the bed size for a given size carbon monoxide plant decreases which reduces the capital costs of the plant. Also, it is desired to minimize $Q_{LPP}$, since the low pressure purge effluent must be repressurized from about ambient pressure to feed pressure.

Thus, the recycle of the low pressure purge effluent is an energy intensive step which is the principle power contribution to the process. The results of the pilot development unit testing on the adsorbent of Example 1 is shown in Table 3. In all cases, adsorption was carried out at 200 psig with a gas composition of 25% carbon monoxide/2% methane/1% nitrogen and 72% hydrogen. These results show that the compositions of the present invention have higher carbon monoxide productivity, higher carbon monoxide recovery and require less low pressure purge than 5A zeolite. Therefore, these adsorbents are much improved materials for the production of carbon monoxide in this process scheme.

TABLE 3

| Adsorbent | (°C.) T ads | (mmole/ cycle) $Q_e$ | (mmole/ cycle) $Q_{LPP}$ | (mmole/ cycle) $Q_P$ | CO Recovery | $CH_4$ in CO Product |
|---|---|---|---|---|---|---|
| Linde 5A | 24 | 9.17 | 6.97 | 2.20 | 60% | 500 ppm |
| Cu(II) on alumina | 50 | 5.88 | 1.22 | 4.65 | 85% | 32 ppm |

It has already been mentioned that an important step in the production of improved carbon monoxide adsorbents is the pretreatment step. Basically the pretreatment step allows for higher copper dispersion on the support. Table 4 shows the effect of pretreatment on the water adsorption capacity of the support for copper loading and copper dispersion on both carbon and alumina based materials. The results show that the pretreatment step increases both the copper dispersion on the adsorbents and the water adsorption capacity of the support at 20% relative humidity. It follows that techniques that enhance the water adsorption capacity of the support will help increase the dispersion of copper. The enhanced copper dispersion, which was measured by carbon monoxide adsorption, results in increased carbon adsorption capacities.

TABLE 4

| Adsorbent | (wgt %) $H_2O$ Capacity at 20% r.h. | Cu dispersion |
|---|---|---|
| Cu(II) on alumina (pretreated) | 10.8% | 53% |
| Cu(II) on alumina (not pretreated) | 5.7% | 38% |
| Cu(II) on Darco (pretreated) | 5.1% | 46% |
| Cu(II) on Darco (not pretreated) | 0.8% | 28% |

Adsorbents capable of producing high purity carbon monoxide from gas streams containing methane must have a high selectivity for carbon monoxide over methane. It is well known that monovalent copper ions can very selectively reversibly bind carbon monoxide. However, it is difficult to get highly dispersed monovalent copper ions on porous supports. This is primarily because monovalent copper ions are unstable and monovalent copper salts are insoluble. In terms of the stability of monovalent copper ions in oxidizing atmospheres, monovalent copper ions are readily oxidized to bivalent copper ions, while under reducing conditions (such as gas streams containing carbon monoxide) monovalent copper ions are reduced to copper metal. Thus keeping monovalent copper ions stabilized on porous supports is a difficult task. In addition, monovalent copper salts are quite insoluble. In order to get monovalent copper in solution, treatment with either strong acid or base is necessary. Even with these solvents, the solubility of monovalent copper is so low that loading of large weight percents of monovalent copper on porous supports requires many impregnations. Thus, in order to make an adsorbent capable of very selective and reversible carbon monoxide adsorption, there must be a large number of highly dispersed monovalent copper ions on the porous support to maximize available monovalent copper per unit volume of adsorbent bed. This is difficult to do because of the instability and insolubility of monovalent copper. The dispersants of the present invention are effective to achieve the high dispersion of copper, initially as divalent copper subsequently reduced to the monovalent copper, that is required to selectively adsorb bulk quantities of carbon monoxide at high purity from mixed gas streams. Table 5 shows a comparison of examples of the ammonium salts of di- and polycarboxylic acid dispersants of the present invention in contrast to other ammonium compounds and carboxylic acids that could be contemplated as dispersants or reducing agents for copper loaded adsorbents for carbon monoxide.

TABLE 5

| Agent | (mmole/g) Delta n CO | Cu Dispersion |
|---|---|---|
| None | 0.03 | 3% |
| Citric Acid | 0.26 | 43% |
| $NH_4$ Citrate | 0.45 | 56% |
| Dextrose | 0.26 | 29% |
| $NH_4$ Carbonate | 0.10 | 12% |
| $NH_4$ Chloride | 0.08 | 10% |
| $NH_4$ Formate | 0.21 | 24% |

(Delta n CO is isothermal working capacity at 30° C. between 0.1 and 1 atm.)

Additional examples were conducted to demonstrate not only the efficacy of the ammonium salts of di- and polycarboxylic acids but also the advantage of the other preferred way of activating the composite adsorbent by subjecting it to reducing gas, preferably containing carbon monoxide, at controlled temperatures preferably not in excess of 150° C., optimally not in excess of 120° C.

EXAMPLE 3

160 grams of LaRoche alumina grade 201 was dried at 200° C. in air and then impregnated with an aqueous solution produced by adding 72 ml of water to 49.6 grams of $CuCl_2.2H_2$) and 6.4 grams of ammonium citrate dibasic. The impregnation was carried out at 20° C. The material was then divided into four parts and subjected to different activation conditions. The different activations included: 1) air drying at 120° C. for 16 hours, 2) activation in 25% CO and 75% $H_2$ at 70° C. for 16 hours, 3) activation in 25% CO and 75% $H_2$ at 120° C. for 16 hours and 4) activation in $N_2$ at 200° C. for 16 hours. Following these activations, CO adsorption isotherms were measured at 30° C. in a standard volumetric adsorption apparatus. The CO working capacity was determined by the difference in CO capacity at 1 atm with the capacity at 0.1 atm for a given activation procedure. The CO dispersion was calculated from the CO isotherm using the following equation:

$$\text{Dispersion (\%)} = \frac{V_m - V_m \text{ alumina}}{\text{Cu loading}} * 100$$

where $V_m$ is the CO monolayer capacity of the adsorbent determined from the Langmuir isotherm, $V_m$ alumina is the CO monolayer capacity for the untreated alumina and Cu loading is the copper loading of the adsorbent. All these values are in units of mmole/g. The results are reported in Table 6.

The key aspect of the results of Example 3 reported in Table 6 is that highly dispersed, high CO capacity adsorbents can be formed and activated at lower temperatures where the ammonium carboxylate does not decompose into by-products which would have reducing characteristics and at which temperatures there is no chloride release during activation from chloride containing copper species, which would amount to a corrosion problem for either the synthesis equipment or the gas separation equipment.

EXAMPLE 4

Additional adsorbents reported in Table 7 were produced in the exact manner as that described in Table 6 and Example 3, except that no ammonium carboxylates were used in the synthesis of these adsorbents. The activation gas and temperature are given in Table 7 and in all cases the duration was 16 hours. As in Table 6, adsorbent performance was measured by CO adsorption isotherms. The important points brought forth in Table 7 include: 1) comparison of data in Tables 6 and 7 show that ammonium salts of di- and polycarboxylic acids do improve dispersion over the examples without an ammonium carboxylate, 2) simple synthesis gas activation of $CuCl_2$ on alumina can yield useful CO adsorbents and 3) activation in CO containing reducing gas produces a better adsorbent than activation in reducing gas without CO.

TABLE 6

| Activation Procedure | (mmole/g) CO Working Capacity | (%) Dispersion |
|---|---|---|
| Air dry, 120° C. | 0.02 | 1% |
| 25% CO/75% $H_2$, 70° C. | 0.20 | 29% |
| 25% CO/75% $H_2$, 120° C. | 0.52 | 54% |
| 25% CO/75% $H_2$, 150° C. | 0.63 | 72% |
| $N_2$, 200° C. | 0.45 | 56% |

TABLE 7

| Activation Procedure | (mmole/g) CO Working Capacity | (%) Dispersion |
|---|---|---|
| Air dry, 120° C. | 0.01 | 0% |
| 25% CO/75% $H_2$, 70° C. | 0.05 | 9% |
| 25% CO/75% $H_2$, 120° C. | 0.36 | 43% |
| 25% CO/75% $H_2$, 150° C. | 0.56 | 64% |
| 98% $N_2$/2% $H_2$, 150° C. | 0.05 | 16% |
| 100% $H_2$, 150° C. | 0.28 | 35% |

It is apparent that the ammonium salts of di- and polycarboxylic acids give the best dispersions in comparison to other oxy compounds and other ammonium compounds. The present invention preferably achieves copper dispersions sufficient to selectively adsorb bulk quantities of carbon monoxide from carbon monoxide and methane-containing gas streams so as to produce a carbon monoxide product gas having less than 25 ppm of methane, more preferably the copper dispersion is in the approximate order of magnitude of 30 to 80%. Dispersion is defined as the moles of copper on the surface of the composition divided by the total moles of copper in the composition. Although not wishing to be held to any particular theory, it is believed that the ammonium salts of di- and polycarboxylic acid salts work best as dispersants because the copper ion-exchanges with the ammonium in solution before actual deposition on the support to disperse the copper to a greater degree than mere solute dissolution in a solvent so that when the impregnation occurs and the solvent is removed, the copper is in a much more highly dispersed condition than mere dissolution of a solute in a solvent would provide. It is also apparent that the ammonium salts of acids give higher CO working capacities than the other oxy compounds and ammonium compounds. As a result, the compositions of the present invention provide better adsorbents than the prior art adsorbents that do not use such dispersants.

The ammonium salts of di- and polycarboxylic acid dispersants of the present invention also have another advantage in processing economics. These dispersants lead to less corrosion of process equipment during manufacture due to their enhanced ability to capture chlorides evolved during the use of cupric chloride and other chloride copper sources. HCl evolves during the thermal activation of the compositions. In the case of citric acid, ion exchange of the proton on the acid with CU(II) ions leads to the formation of HCl in the solution. Upon activation of the adsorbent, the HCl is evolved which leads to corrosion of piping downstream of the activation vessel. On the other hand, in the ammonium citrate case, ion exchange of CU(II) for ammonium ions takes place in solution, thereby effectively buffering the solution. Upon thermal activation of the adsorbent, the majority of the chloride ion is retained on the adsorbent surface, reducing potential corrosion problems.

Evidence of the significance of using the ammonium salt is given in Table 8. The aqueous impregnating solution using ammonium citrate has a higher pH than that using citric acid. This shows that the hydrogen-ion content, and therefore devolatilized HCl upon activation, In the ammonium citrate solution is less. In addition, Table 8 shows that the Cl/Cu molar ratio of both unactivated samples is 2.0 as would be expected from the starting material $CuCl_2$. However, after thermal treatment in $N_2$ at 200° C., the Cl/Cu ratio on the ammonium citrate sample is 1.8, while that of the citric acid sample is 1.4. This clearly shows that the present invention's dispersants of ammonium salts of di- and polycarboxylic acids lead to the desirable retention of chloride on the support.

TABLE 8

| Adsorbent | Solution pH | Cl/Cu Ratio |
|---|---|---|
| $NH_4$ Citrate (unactivated) | 2.8 | 2.0 |
| $NH_4$ Citrate (activated) | — | 1.8 |
| Citric Acid (unactivated) | 1.5 | 2.0 |
| Citric Acid (activated) | — | 1.4 |

Another approach to achieving high $CO/CH_2$ selectivity, is to minimize adsorption of methane. Since there are no specific forces involved in adsorption of methane, the extent of methane adsorption is controlled by the porous structure of the support. Methane adsorption is enhanced as the pore size of the support decreases. Thus, microporous supports like zeolites and gas phase carbons will exhibit significant methane adsorption and therefore lower CO/CH$_4$ selectivity than macroporous supports like amorphous oxides, silica, alumina, silica-alumina, titania and liquid phase carbons. Therefore, the adsorbents produced by the techniques described in the present invention consist of porous, preferably macroporous, supports, typically having pores greater than approximately 20 Angstroms in diameter, upon which are impregnated highly dispersed insoluble and unstable monovalent copper ions. These monovalent copper ions demonstrate selective and reversible carbon monoxide adsorption, which is needed for the production of high purity carbon monoxide by adsorption, while the macroporous characteristics of the support preclude any contemporaneous adsorption of methane which would diminish the overall adsorbent selectivity.

The compositions of the present invention are also useful as adsorbents for selectively adsorbing olefins, such as ethylene, from mixed gases. In tests comparable to the tests run to obtain the data for Table 1 above, runs were also undertaken to selectively adsorb ethylene from a gas mixture using a prior art adsorbent (5A zeolite) and an example of the present invention. This is reported in Table 9 below wherein K values are of comparable or analogous measurements as recited for Table 1 above.

TABLE 9

| Adsorbent | (mmole/g/atm) $K_H$ C$_2$H$_4$ at 30° C. | (mmole/g/atm) $K_H$ C$_2$H$_6$ at 30° C. | $S_H$ | (mmole/g/atm) N C$_2$H$_4$, 2 atm. 30° C. |
|---|---|---|---|---|
| Linde 5A | 180 | 9 | 20 | 2.5 |
| Cu (II) on alumina (Ex. 1) | 27 | 0.09 | 300 | 1.0 |

It is apparent that the olefin selective adsorbent of the present invention has a much higher selectivity for ethylene than the prior art adsorbent. Such selectivity can be translated into higher purities and reduced capital cost for a given quantity of gas to be separated.

The pretreatment step for the supports of the present invention is important in combination with the actual procedure for dispersing copper on the support in achieving the loadings and extent of dispersion necessary for the superior selectivity and working capacity for carbon monoxide that adsorbents of the present invention display. The present invention differs from previous descriptions of copper-bearing carbon monoxide adsorbents by the use of pretreatment of the support in conjunction with dispersants for the solvent impregnation of copper to result in the improved compositions of the present invention. The pretreatment step can be achieved in a number of ways, dependent on the nature of the support, that is taking into account whether the support is an amorphous oxide or carbon. Prior to impregnation of carbon supports with monovalent copper ions, the present invention describes a preoxidation step. This oxidation step, which can be accomplished by either gas phase oxidants such as air, oxygen, steam, or nitrogen oxides or liquids such as nitric acid, hydrogen peroxide and others, puts oxygen functional groups on the carbon surface which serve as anchors for the monovalent copper ions. In addition, the oxidation step produces a more polar support which is more readily wetted by the polar monovalent copper salt solutions than the untreated carbon. Both the enhanced wetting and the anchoring sites for monovalent copper produce an adsorbent with improved monovalent copper dispersion and therefore carbon monoxide capacity. With respect to inorganic supports, pretreatment of amorphous oxides supports also enhances monovalent copper dispersion. Enhancing the surface acidity of inorganic supports prior to liquid phase impregnation increases the dispersion of monovalent copper and therefore increases carbon monoxide adsorption capacity. Increasing the surface acidity of inorganic oxides can be accomplished by simple heat treatment, preferably in inert gases, to approximately 100° to 500° C. or by pretreatment of the support with mineral acids.

The present invention has been described with regard to a novel combination of pretreatment of macroporous supports and subsequent impregnation of bivalent copper in an aqueous solution using ammonium salts of di- and polycarboxylic acid dispersants to achieve very high dispersions of the copper on the support. The composite composition is subsequently post-treated at elevated temperature in inert gas to reduce the bivalent copper to monovalent copper. The advantage of this technique for the production of carbon monoxide adsorbents is that bivalent copper salts are very soluble in aqueous solutions. This obviates the need for strong acid or base solutions as in the case of impregnating monovalent copper salts. Impregnation of porous supports with solutions of strong acid or base require pollution abatement techniques which increase the price of the adsorbent. In addition, the solubility of bivalent copper salts in water are much greater than the monovalent copper salts in acid or base solution, which means that the bivalent copper salts in aqueous solution require fewer impregnations to achieve a desired copper loading. The techniques described in the present invention for monovalent copper-based carbon monoxide adsorbents are different from those previously disclosed in that a pretreatment step is involved, a different impregnation technique is employed, ammonium salts of di- and polycarboxylic acid dispersants are added directly to the aqueous bivalent copper solution and post-treatment reduction is employed. Increasing the acidity and water adsorption capacity of the inorganic support enhances the dispersion of the bivalent copper and therefore increases the carbon monoxide capacity. Furthermore, a preoxidation step with carbonaceous supports increases the dispersion of bivalent copper and increases the carbon monoxide capacity as well.

Recently the purity specification for carbon monoxide have become more stringent, requiring very low methane impurities of the order of 25 ppm in the carbon monoxide product. Adsorbents produced by the techniques described in the present invention are capable of separating methane from carbon monoxide to produce high purity carbon monoxide products having less than 25 ppm of methane. In this way, the composite compositions of the present invention overcome the drawbacks and effect a solution to outstanding problems in the industry utilizing high purity carbon monoxide.

The present invention has been set forth with regard to several preferred embodiments, but the full scope of the invention should be ascertained from the claims which follow.

We claim

1. A process of selectively separating a gas component selected from the group consisting of carbon monoxide or olefins from a gas mixture containing said gas component and at least one other gas selected from the group consisting of carbon dioxide, methane, nitrogen, hydrogen, argon, helium, ethane and propane, comprising contacting the gas mixture with a cuprous halide-containing adsorbent comprising a high surface area support of amorphous oxide or carbon and a dispersed cuprous halide prepared by impregnating the support with a cupric compound in an aqueous solvent having an ammonium salt of di- or polycarboxylic acid dispersant, dispersing the compound on the support with the dispersant, removing the solvent and reducing the cupric compound to a cuprous halide on the support in the presence of a reducing gas, selectively adsorbing the gas component on the adsorbent, and separately desorbing the gas component from the adsorbent to recover the gas component.

2. The process of claim 1 wherein the reducing gas contains carbon monoxide.

3. The process of claim 1 wherein the reducing gas contains synthesis gas.

4. The process of claim 1 wherein the cupric compound is reduced at a temperature up to approximately 150° C.

5. The process of claim 1 wherein the cupric compound is reduced at a temperature up to approximately 120° C.

6. The process of claim 1 wherein an amorphous oxide support is pretreated by heating to an elevated temperature to make the support more susceptable to impregnation of the compound.

7. The process of claim 1 wherein a carbon support is pretreated by oxidation to make the support more susceptable to impregnation of the compound.

8. The process of claim 1 wherein the ammonium salt of di- and polycarboxylic acid dispersant is selected from the group consisting of ammonium citrate, ammonium tartrate, ammonium succinate, ammonium phthalate, ammonium adipate, ammonium (ethylenediamine)-tetraacetate, and mixtures thereof.

9. The process of claim 1 wherein the cupric compound is selected from the group consisting of cupric halides, cupric amine complexes and mixtures thereof.

10. The process of claim 1 wherein the gas mixture is passed through one or more beds of the adsorbent in a sequence of steps, comprising: adsorbing the gas component from the gas mixture in a bed of such adsorbent, desorbing the bed of adsorbent after adsorption, purging the bed of adsorbent with the gas component, evacuating the bed of adsorbent to recover the gas component, and repressurizing the bed of adsorbent to the pressure of adsorption by passing a non-adsorbed gas into the bed of adsorbent.

11. A process of selectively separating carbon monoxide from a gas mixture containing carbon monoxide and at least one other gas selected from the group consisting of carbon dioxide, methane, nitrogen, hydrogen, argon, helium, ethane and propane, comprising contacting the gas mixture with a cuprous halide-containing adsorbent comprising a high surface area support of amorphous oxide or carbon and a dispersed cuprous compound prepared by impregnating the support with a cupric compound in an aqueous solvent having an ammonium salt of di- or polycarboxylic acid dispersant, dispersing the compound on the support with the dispersant, removing the solvent and reducing the cupric compound to a cuprous halide on the support in the presence of a reducing gas containing carbon monoxide at a temperature up to approximately 120° C., selectively adsorbing carbon monoxide on the adsorbent, and separately desorbing the carbon monoxide from the adsorbent to recover the carbon monoxide.

* * * * *